United States Patent
Kesler et al.

(10) Patent No.: US 6,955,164 B2
(45) Date of Patent: Oct. 18, 2005

(54) AUTOMOTIVE IGNITION SYSTEM WITH SPARKLESS THERMAL OVERLOAD PROTECTION

(75) Inventors: Scott B. Kesler, Kokomo, IN (US); John R. Fruth, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/779,906

(22) Filed: Feb. 17, 2004

(65) Prior Publication Data

US 2005/0178372 A1    Aug. 18, 2005

(51) Int. Cl.[7] .............................................. F02P 11/00
(52) U.S. Cl. ...................................... 123/630; 123/644
(58) Field of Search ............................... 123/630, 609, 123/644, 647, 651, 652; 307/116

(56) References Cited

U.S. PATENT DOCUMENTS

| | | | |
|---|---|---|---|
| 4,854,731 A | | 8/1989 | Jenkins |
| 5,819,713 A | * | 10/1998 | Kesler .......................... 123/630 |
| 6,100,728 A | * | 8/2000 | Shreve et al. ................. 327/110 |
| 6,360,720 B1 | * | 3/2002 | Kesler ..................... 123/406.55 |
| 6,369,646 B1 | * | 4/2002 | Kesler et al. .................. 327/564 |
| 6,450,157 B1 | * | 9/2002 | Kesler et al. ................. 123/630 |
| 6,628,040 B2 | * | 9/2003 | Pelrine et al. ................ 310/307 |
| 6,766,243 B1 | | 7/2004 | Haussmann et al. |
| 6,777,781 B1 | * | 8/2004 | Lorenz ......................... 257/565 |
| 2004/0011342 A1 | * | 1/2004 | Futatsu ........................ 123/630 |
| 2004/0075103 A1 | | 4/2004 | Topp et al. |

FOREIGN PATENT DOCUMENTS

| | | |
|---|---|---|
| EP | 0 256 715 | 2/1988 |
| JP | 8338350 | * 12/1998 |
| JP | 20011193617 | * 7/2001 |
| WO | 01/25625 | 4/2001 |
| WO | 03/034590 | 4/2003 |

* cited by examiner

Primary Examiner—Henry C. Yuen
Assistant Examiner—Arnold Castro
(74) Attorney, Agent, or Firm—Stefan V. Chmielewski

(57) ABSTRACT

An interface for providing thermal overload protection includes a switching device, a temperature indicating device, a drive circuit and a thermal monitoring circuit. The thermal monitoring circuit is coupled across the temperature indicating device and provides a shutdown signal to the drive circuit when the temperature of the switching device is above a predetermined temperature level as indicated by a temperature signal provided by the temperature indicating device. The drive circuit responds to the shutdown signal by removing current sources and current sinks from a control terminal of the switching device at which point leakage currents cause the switching device to reduce a drive current to an inductive load.

20 Claims, 3 Drawing Sheets official# AUTOMOTIVE IGNITION SYSTEM WITH SPARKLESS THERMAL OVERLOAD PROTECTION

TECHNICAL FIELD

The present invention is generally directed to an interface for providing thermal overload protection and, more specifically, to an automotive ignition system with sparkless thermal overload protection.

BACKGROUND OF THE INVENTION

Modern automotive ignition systems have provided protection from fault conditions that result in excessively long dwell times by a variety of techniques. For example, some systems have employed time-based protection that terminates a drive signal to an ignition coil current switching device, e.g., an insulated gate bipolar transistor (IGBT), when a predetermined dwell time was exceeded. Other existing systems have employed thermally triggered dwell termination that functions when excessively high temperatures are detected within a switching circuit and/or a control integrated circuit (IC). These methodologies, while generally effective in preventing damage to a control IC and/or a switching circuit, have several drawbacks. For example, time-based protection methods have required external timing capacitors.

Further, current thermal shutdown techniques generate a spark event at the spark plug, following the thermal shutdown, unless an external capacitor is utilized for control purposes. This is undesirable as a mistimed spark can cause damage to an engine if the spark leads or lags a desired spark timing point by any appreciable amount. Further, when the protection mechanism is purely thermally based, a number of variables, e.g., battery voltage, ignition coil resistance and ambient temperature of the control electronics, affect the timing of a thermal shutdown. As such, it is difficult to predict an absolute time, following the start of dwell, that a spark may occur. It should be appreciated that protection of an ignition system at the cost of engine damage is undesirable.

Some existing over-dwell protection systems have decreased an ignition coil current in a manner that has prevented the production of a spark at an associated spark plug. This type of sparkless dwell termination is commonly referred to as a "soft shutdown." An example of one such over-dwell protection system is disclosed in U.S. Pat. No. 5,819,713. This over-dwell protection system uses external timing capacitors to generate a slow ramp down voltage which is, in turn, applied to a control terminal of a switching device, e.g., a gate of an IGBT. While accomplishing the task of terminating a dwell event without the production of a spark, such systems incur the cost of an external capacitor, increased packaging space required for the capacitor and related interconnect wiring, as well as additional control die area for the required soft shutdown circuitry.

Advances in electronic packaging techniques are allowing modern ignition control electronics to be packaged with increasing density and to be placed into hostile environments. In many cases, integrated electronic control circuits are being packaged with the high power switching transistors that they control, in single over-molded plastic packages. These packages are then embedded in individual ignition coil housings. With these types of assemblies, package size, interconnect reliability and cost may result in significant design constraints. The additional control die area and expense of external capacitors and the related interconnects required for the existing soft shutdown protection implementations are therefore undesirable.

What is needed is a technique for performing temperature-based over-dwell termination that provides a soft shutdown without requiring external timing or soft shutdown control capacitors.

SUMMARY OF THE INVENTION

Embodiments of the present invention are directed to an interface for providing thermal overload protection. The interface includes a switching device, a temperature indicating device, a drive circuit and a thermal monitoring circuit. The switching device includes a control terminal and a pair of output terminals that are configured to provide a drive current to an inductive load responsive to a control signal on the control terminal. The temperature indicating device is located approximate the switching device and receives a bias current and provides a temperature signal that provides an indication of a temperature of the switching device. The drive circuit is coupled to the control terminal of the switching device and provides the control signal at the control terminal of the switching device responsive to an external signal. The thermal monitoring circuit is coupled across the temperature indicating device and provides a shutdown signal to the drive circuit when the temperature of the switching device is above a predetermined temperature level, as indicated by the temperature signal. The drive circuit responds to the shutdown signal by removing current sources and current sinks from the control terminal of the switching device at which point leakage currents associated with the control terminal of the switching device cause the switching device to reduce the drive current to the inductive load in a predictable manner.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Various embodiments of the present invention are directed to the detection of a temperature of a switching device, e.g., an insulated gate bipolar transistor (IGBT), in an automotive ignition system and discontinuing a drive signal at a control terminal of the switching device in a controlled fashion, when the temperature of the switching device exceeds a predetermined temperature level, to prevent a spark event. This is accomplished by monitoring the surface temperature of the switching device, via, for example, a plurality of serially connected diodes with known temperature characteristics, integrated within the switching device. These diodes are connected to a control integrated circuit (IC) and are biased by a current generated in the control IC. The control IC monitors a voltage developed across the diode string and if the voltage falls below a predetermined level, indicating a high temperature level, the drive connections to the control terminal of the switching device are effectively open circuited, allowing the switching device to, in effect, turn itself off via natural leakage currents associated with the control terminal. This turn-off period is sufficiently long so as to insure that current (i.e., ignition coil current) through the switching device is reduced at a rate that precludes a spark from occurring at an associated spark plug.

According to one embodiment of the present invention, an interface is disclosed that, in response to a thermal overload condition, shuts off a gate drive to an insulated gate bipolar transistor (IGBT) in a fashion that reduces a coil current provided to a coil primary at a rate that prevents voltages on an associated coil secondary from reaching levels high enough to cause a spark across a gap of an associated spark plug.

Figure 1:
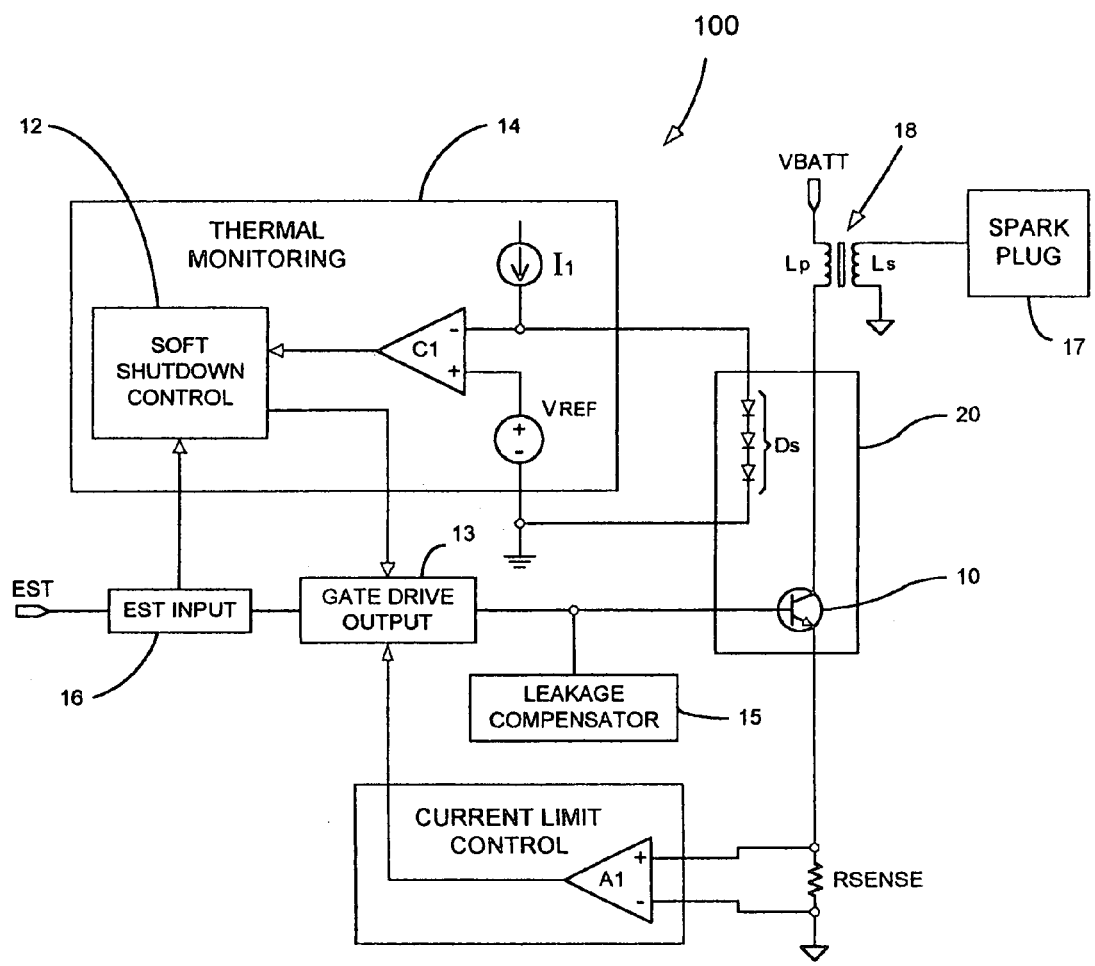
FIG. 1 is an electrical diagram, in block and schematic form, of an interface for providing sparkless thermal overload protection for an ignition system, according to one embodiment of the present invention.

Referring to FIG. 1, a diode string Ds integrated with a switching transistor 10, e.g., an IGBT, in a monolithic integrated circuit 20, includes a plurality of polysilicon diodes which are electrically isolated from active regions of the transistor 10. As shown, a current source 11 provides a bias current to the diode string Ds to develop a temperature-dependent voltage, which is monitored by a comparator C1, across the string Ds. The voltage across the diode string Ds decreases as the temperature of the transistor 10 increases, since the forward biased diode voltage has a negative temperature coefficient. When the diode string Ds voltage approaches a voltage that corresponds to the desired shutdown trip temperature, an output of the comparator C1 changes state causing a latch (not separately shown in FIG. 1) in a soft shutdown control section 12 to be set. This latch records the fact that a thermal trip has occurred and is reset only when an electronic spark timing (EST) signal returns to an inactive state.

Under normal operating conditions, a typical ignition system operates under what is known as a "ramp and hold" method of dwell timing. Engine control electronics issue an EST signal that is received by EST input circuitry 16. As a result of this active EST input, the transistor 10 is driven with a gate drive signal that forces the transistor 10 into saturation and the ignition coil 18 begins an inductively limited current charging period. As in existing systems, when the coil current reaches a predetermined level, as detected by the voltage across a sense resistor Rsense, a current limit control amplifier A1 acts to reduce the gate drive to a level that maintains a constant current through the coil 18 and transistor 10. During this current limiting period, the voltage across the collector and emitter terminals of the transistor 10 is much higher than the saturation voltage present during the coil charging period and consequently the power dissipation increases proportionally. This power increase eventually results in excessive temperature levels in the transistor 10 if the dwell period is longer than expected for normal system operation.

According to the present invention, when a thermal trip occurs, all transistors connected to the gate of the transistor 10 are turned off, removing any current sources or sinks, and causing the gate voltage to decay as a result of natural gate leakage currents associated with the transistor 10. This decay rate is sufficiently slow to allow a gradual decrease in coil current such that the coil energy dissipates without causing a high voltage spike at the coil secondary Ls output.

The control circuitry may exist on a die separate from the transistor 10. However, due to the proximity of the control die to the transistor 10, the die temperature may be very high. At temperatures that may be as high as 160–185 degrees C., leakage currents inherent in junction isolated integrated circuitry become non-negligible. Therefore, any attempt to turn off the transistors coupled to the gate of the transistor 10, to allow a natural voltage decay to occur, will be disrupted by the junction leakage currents associated with any connected devices.

It is therefore desirable to compensate for these leakage currents. A suitable technique for leakage current compensation is disclosed in U.S. Pat. No. 6,369,646, which is hereby incorporated herein by reference in its entirety. This technique employs specific leakage compensator geometries that naturally track the current that leaks from epitaxial regions of NPN transistors to an adjacent substrate region. These compensators also automatically track silicon processing variations eliminating the need for trimming of the leakage compensator. By associating a leakage compensator with each epitaxial region connected to an IGBT gate an effective balance of currents can be achieved, allowing for slow gate voltage decay rates at virtually any temperature.

Figure 2:
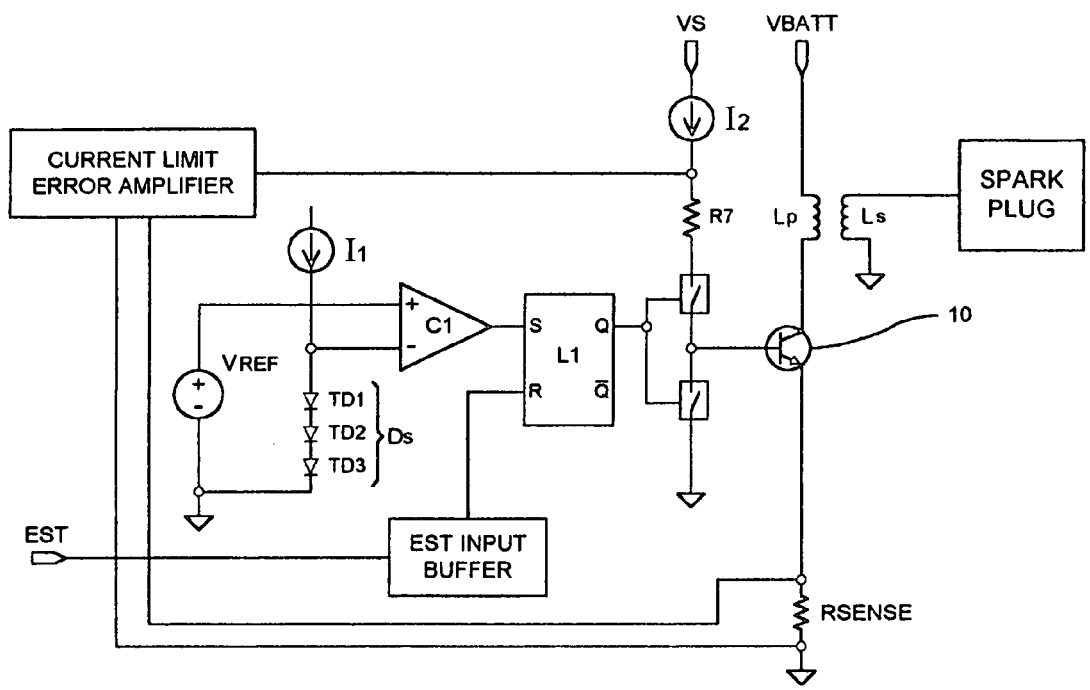
FIG. 2 is an electrical diagram, in block and schematic form, of an interface for providing sparkless thermal overload protection for an ignition system, according to another embodiment of the present invention.

FIG. 2 depicts a functional level schematic of one embodiment of the present invention. As shown, thermal diodes TD1–TD3, integrated with the transistor 10, provide a voltage input to an inverting input of the comparator C1. The non-inverting input of the comparator C1 receives a reference voltage Vref that is selected, based on known thermal characteristics of the thermal diodes TD1–TD3. When the diodes TD1–TD3 reach a thermal trip temperature, their combined forward voltage drop, as established by current source 11, falls below Vref which causes an output of the comparator C1 to transition to a high state. The output of the comparator C1 is coupled to a SET input of latch L1. When the output of the comparator C1 transitions to the high state, an output Q of the latch L1 goes high effectively opening all connections to the gate terminal of the transistor 10. The latch L1 may be reset directly by a low level (non-fault) input at the EST input. Alternatively, completion of the soft shutdown cycle may be required before allowing the transistor 10 to be turned on again. This generally precludes the possibility of generating a mistimed spark due to the fall of EST during the soft shutdown period. The current limit function operates independently of the invention circuitry and is also disconnected from the transistor 10 gate during (and after) the soft-shutdown event.

Figure 3:
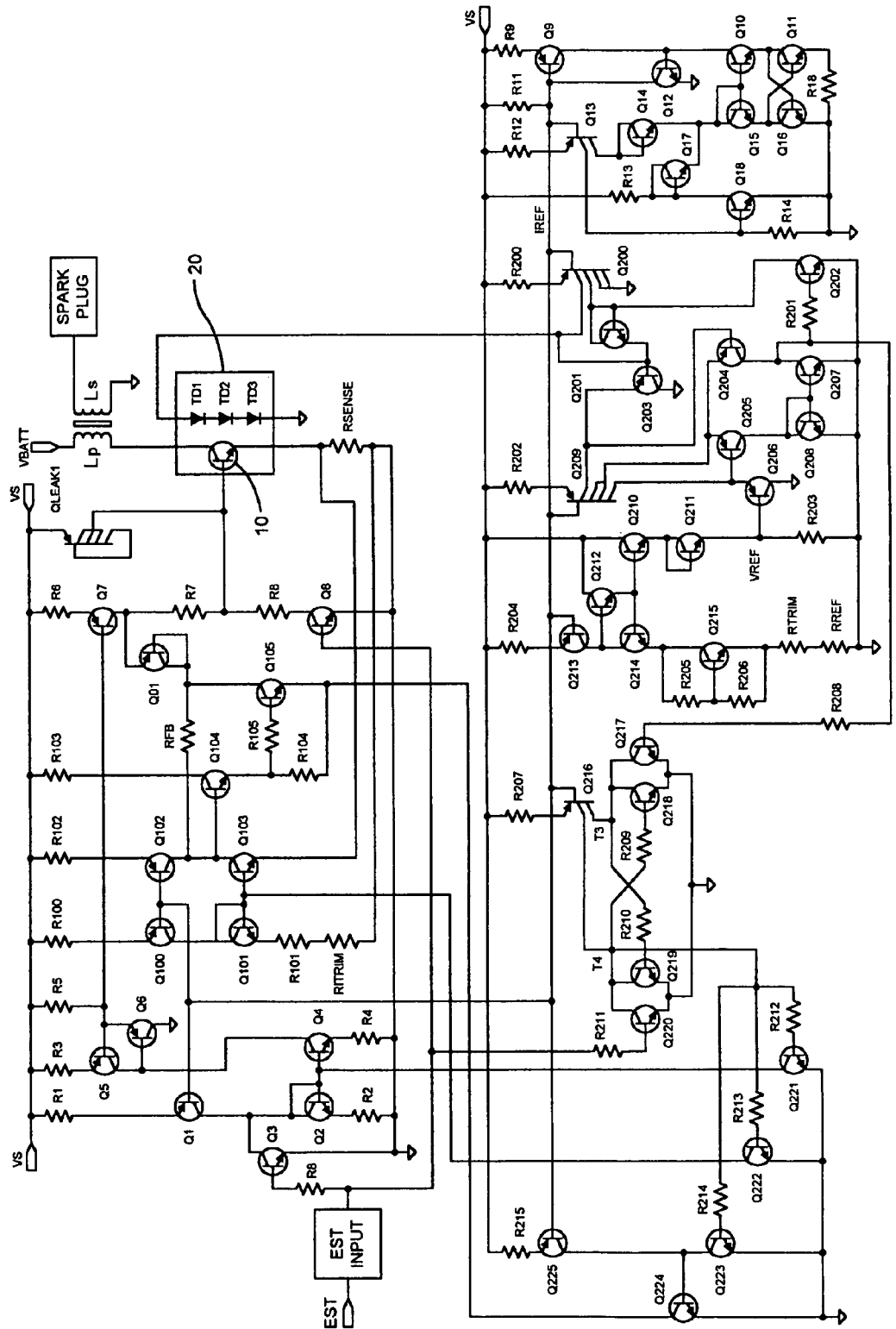
FIG. 3 is an electrical diagram, in schematic form, of an interface for providing sparkless thermal overload protection for an ignition system, according to still another embodiment of the present invention.

FIG. 3 shows a transistor level schematic of one embodiment of the present invention. Transistors Q9–Q18 and resistors R9–R14 compose a reference current generator of the type generally known as a "Delta Vbe" generator. This type of current generator is a standard building block, which is known to those, skilled in the art and, as such, is not further described herein. The reference current Iref provided by the current generator has a slight positive temperature coefficient and is defined by the equation:

$$Iref = \frac{Vt * \ln(N)}{Rdvbe}$$

where Vt is the thermal voltage defined by the expression kT/q, N is a constant and is defined by the ratio of emitter areas of NPN transistors used to develop the delta-Vbe current and Rdvbe is the resistance chosen to establish the magnitude of the current and corresponds to R14 in FIG. 3. In the previous expression kT/q: k is Boltzman's constant, T is the temperature in degrees Kelvin and q is the electric charge.

In one embodiment, N is set equal to 9. The reference current Iref is used to bias a current mirror rail that biases other circuitry including the circuitry that establishes the gate drive output charging current. This output current is developed by mirroring a copy of Iref, sourced by the collector of transistor Q1, via the NPN current mirror composed of transistors Q2 and Q4 along with resistors R2 and R4, onto transistor Q5. The transistor Q5 is in turn part of a PNP current mirror composed of transistors Q6 and Q7 and resistors R3, R5, and R6. The collector current of the transistor Q7 is the charging current used for turning on IGBT 10. Transistor Q3, driven by the EST input circuitry, acts as a switch to enable or disable the gate drive output current. When the EST signal commands the IGBT 10 into the off state, transistor Q3 is turned on which disables the transistors Q2 and Q4 and enables the transistor Q8, pulling the gate of the IGBT 10 low.

The current limit control circuitry, which is an error amplifier with negative feedback, is composed of transistors Q100–Q105 and resistors RITRIM and R100–R105. This circuitry responds to the IGBT 10 emitter current via a voltage sensed across the sense resistor Rsense. The current limit control circuitry controls the voltage applied to the gate of the IGBT 10 in order to establish a stable, limited IGBT 10 current. Resistor R7 acts to aid in the stability of this control loop. A feedback resistor Rfb provides local feedback and, in part, sets the gain of the current limit control loop. The output section of this amplifier, composed of the transistors Q104–Q105 and the resistors R104–R105 can be effectively disconnected from its ground connection by turning off transistor Q224. Removing this current sinking path is part of the process of isolating the IGBT 10 gate from any current sources or sinks during the soft shutdown period.

Additionally, the transistors Q101 and Q103 are turned off by transistor Q222 to prevent the transistor Q103 from pulling current away from the IGBT 10 gate. With the transistor Q103 off and the transistors Q104–Q105 disconnected from a ground path, the transistor Q102 pulls the connected end of the resistor Rfb high, reverse biasing diode connected transistor QD1. Transistor Q221 turns off the NPN current mirror combination of the transistors Q2 and Q4. This in turn shuts off the PNP current mirror made up of the transistors Q5 and Q7. Resistor R5 acts to pull up the bases of these two transistors, ensuring that the transistor Q7 does not source any current onto the gate of the IGBT 10. At this point, with transistor Q8 already being commanded off by the EST input, all paths for current flowing to or from the IGBT 10 gate have been deactivated. The signals that control this deactivation, based on the IGBT 10 temperature, are further discussed below.

A relatively temperature independent reference voltage can be developed by forcing the delta Vbe current through a series combination of one or more diodes and a carefully selected integrated silicon diffused resistor. Silicon diffused resistors typically have positive temperature coefficients, while the integrated diode forward voltage drops have a negative temperature coefficient. By combining the diode forward voltages with the voltage developed across the silicon diffused resistor with the delta-Vbe current, a voltage that is some multiple of the silicon bandgap voltage (approximately 1.26 volts) is developed. In this case, in order to allow adjustment of the thermal regulation set-point, a "Vbe multiplier" configuration may be used in place of a fixed number of individual diodes. Transistor Q215, combined with resistors R205 and R206, forms the Vbe multiplier. The voltage across the collector and emitter terminals of the transistor Q215 is defined by:

$$Vbe(1+R205/R206)$$

This voltage is in series with the voltage drop formed across the resistor Rref and the trim resistor Rtrim. By proper choice of values for resistors R205, R206, Rref and Rtrim, a voltage reference with any desired magnitude and temperature coefficient can be developed. The calculations necessary to accomplish this can be readily made by one skilled in the art and, as such, are not further discussed herein.

The reference voltage Vref is transferred to the diode tied transistor Q211, via the biased base-emitter junctions of transistors Q214 and Q210. In order to develop a temperature regulation point at a substantially high temperature, where the total drop across the string of thermal diodes is relatively low, the voltage across a base-emitter junction of the transistor Q211 is used to offset one Vbe voltage component of the voltage developed across the collector and emitter of the transistor Q215. This allows a reference voltage with a magnitude less than one silicon bandgap voltage to be applied to the thermal diode string. Additionally, by inserting a string of trim resistors with shorting fuses in series with the resistor Rref, the overall thermal regulation point can be modified as desired for a given application.

The thermal reference voltage is compared to the voltage present across the string of thermal sense diodes TD1–TD3 integrated with the IGBT 10. The diodes TD1–TD3 are biased by the current from transistor Q200, both directly and via a diode tied transistor Q201. Transistors Q203–209 and resistor R202 form a comparator. The output of the comparator, at the collector of transistor Q207, drives both transistors Q217 and Q202. The transistor Q202 acts to shunt some of bias current of the transistor Q200 to ground, when a thermal trip has occurred. This action serves to provide a hysteresis function in the thermal comparator, causing its output to remain high for an extended period of time. The transistor Q217, is part of a simple SR latch composed of transistors Q217–Q220 and resistors R208–R211. When a thermal trip occurs, as detected by the comparator, the latch is set, causing the voltage at the collector of the transistor Q220 to assume a high state. This high level logic signal then drives transistors Q221–Q224. These transistors, as described above, handle the isolation of the IGBT 10 gate, allowing the soft shutdown to proceed. In one embodiment of the present invention, the latch is reset by the inverted output of the EST input circuitry, when the EST signal transitions to a low level.

The compensation for the leakage currents in the epitaxial pockets associated with transistors connected to the IGBT 10 gate may be handled by the device Qleak1, represented by a multiple collector PNP transistor. This device may be scaled, as described in U.S. Pat. No. 6,369,646, to provide an equal balance for the epitaxial region to isolation leakage currents inherent to the devices that are attached to the IGBT 10 gate.

Accordingly, circuitry has been described herein that performs temperature-based over-dwell termination and provides a soft shutdown without requiring external timing or soft shutdown control capacitors. Such circuitry may advantageously be employed within an automotive ignition system.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An interface for providing thermal overload protection, comprising:
    a switching device including a control terminal and a pair of output terminals, wherein the pair of output terminals are configured to provide a drive current to an inductive load responsive to a control signal on the control terminal;
    a temperature indicating device located approximate the switching device, the temperature indicating device receiving a bias current and providing a temperature signal that provides an indication of a temperature of the switching device;
    a drive circuit coupled to the control terminal of the switching device, the drive circuit providing the control signal at the control terminal of the switching device responsive to an external signal; and
    a thermal monitoring circuit coupled across the temperature indicating device, the thermal monitoring circuit providing a shutdown signal to the drive circuit when the temperature of the switching device is above a predetermined temperature level as indicated by the temperature signal, wherein the drive circuit responds to the shutdown signal by removing current sources and current sinks from the control terminal of the switching device at which point leakage currents associated with the control terminal of the switching device cause the switching device to reduce the drive current to the inductive load.

2. The interface of claim 1, wherein the temperature indicating device includes a plurality of serially coupled diodes.

3. The interface of claim 2, wherein the plurality of serially coupled diodes are polysilicon diodes.

4. The interface of claim 1, wherein the switching device is an insulated gate bipolar transistor (IGBT).

5. The interface of claim 1, wherein the temperature indicating device and the switching device are located on a monolithic integrated circuit, and wherein the temperature indicating device includes a plurality of serially coupled polysilicon diodes that are electrically isolated from active regions of the switching device.

6. The interface of claim 1, wherein each epitaxial region associated with the control terminal of the switching device includes a leakage current compensator.

7. The interface of claim 1, wherein the switching device is a field effect transistor (FET).

8. The interface of claim 1, wherein the temperature indicating device includes a plurality of serially coupled polysilicon diodes that are electrically isolated from active regions of the switching device and the switching device is an insulated gate bipolar transistor (IGBT).

9. A method for temperature based over-dwell termination without a spark, comprising the steps of:
    receiving a signal that provides an indication of a temperature of a switching device, the switching device controlling an ignition coil current through an ignition coil that is coupled to a spark plug;
    determining when the signal transitions through a predetermined threshold level, wherein the predetermined threshold level corresponds to an upper temperature limit; and
    removing current sources and current sinks from the control terminal of the switching device when the signal transitions through the predetermined threshold level, wherein leakage currents associated with the control terminal of the switching device cause the switching device to reduce the ignition coil current at a rate that prevents the spark plug from generating a spark.

10. The method of claim 9, wherein the temperature indicating device includes a plurality of serially coupled polysilicon diodes.

11. The method of claim 9, wherein the switching device is an insulated gate bipolar transistor (IGBT).

12. The method of claim 9, wherein the temperature indicating device and the switching device are located on a monolithic integrated circuit, and wherein the temperature indicating device includes a plurality of serially coupled polysilicon diodes that are electrically isolated from active regions of the switching device.

13. The method of claim 9, wherein each epitaxial region associated with the control terminal of the switching device includes a leakage current compensator.

14. The method of claim 9, wherein the switching device is a field effect transistor (FET).

15. The method of claim 9, wherein the temperature indicating device includes a plurality of serially coupled polysilicon diodes that are electrically isolated from active regions of the switching device and the switching device is an insulated gate bipolar transistor (IGBT).

16. An automotive ignition system including an interface for providing thermal overload protection, the interface comprising:
    a switching device including a control terminal and a pair of output terminals, wherein the pair of output terminals are configured to provide a drive current to an inductive load responsive to a control signal on the control terminal;
    a temperature indicating device located approximate the switching device, the temperature indicating device receiving a bias current and providing a temperature signal that provides an indication of a temperature of the switching device;
    a drive circuit coupled to the control terminal of the switching device, the drive circuit providing the control signal at the control terminal of the switching device responsive to an external signal; and
    a thermal monitoring circuit coupled across the temperature indicating device, the thermal monitoring circuit providing a shutdown signal to the drive circuit when the temperature of the switching device is above a predetermined temperature level as indicated by the temperature signal, wherein the drive circuit responds to the shutdown signal by removing current sources and current sinks from the control terminal of the switching device at which point leakage currents associated with the control terminal of the switching device cause the switching device to reduce the drive current to the inductive load, and, wherein the switching device is an insulated gate bipolar transistor (IGBT).

17. The system of claim 16, wherein the temperature indicating device includes a plurality of serially coupled polysilicon diodes.

18. The system of claim 16, wherein the temperature indicating device and the switching device are located on a monolithic integrated circuit, and wherein the temperature indicating device includes a plurality of serially coupled polysilicon diodes that are electrically isolated from active regions of the switching device.

19. The system of claim 16, wherein each epitaxial region associated with the control terminal of the switching device includes a leakage current compensator.

20. The system of claim 16, wherein the inductive load is an automotive ignition coil.

* * * * *